(12) United States Patent
Hayashi

(10) Patent No.: US 7,658,275 B2
(45) Date of Patent: Feb. 9, 2010

(54) CARRIER TYPE CONVEYING APPARATUS AND CONVEYING CARRIER CONNECTION SYSTEM OF THE CONVEYING APPARATUS

(75) Inventor: Nobuhiro Hayashi, Shiga (JP)

(73) Assignee: Daifuku Co., Ltd (JP)

( * ) Notice: Subject to any disclaimer, the term of this patent is extended or adjusted under 35 U.S.C. 154(b) by 341 days.

(21) Appl. No.: 11/575,962

(22) PCT Filed: Sep. 9, 2005

(86) PCT No.: PCT/JP2005/016584

§ 371 (c)(1),
(2), (4) Date: Mar. 26, 2007

(87) PCT Pub. No.: WO2006/043372

PCT Pub. Date: Apr. 27, 2006

(65) Prior Publication Data

US 2009/0173603 A1 Jul. 9, 2009

(30) Foreign Application Priority Data

Oct. 21, 2004 (JP) ............................. 2004-306392

(51) Int. Cl.
*B65G 35/06* (2006.01)

(52) U.S. Cl. ................. 198/459.8; 198/459.1; 198/792; 198/795; 198/801

(58) Field of Classification Search ............. 198/459.1, 198/459.8, 729, 792, 795, 801, 867.13, 803.2; 104/94, 95, 292, 293, 299; 414/279, 281, 414/589
See application file for complete search history.

(56) References Cited

U.S. PATENT DOCUMENTS 5,067,413 A * 11/1991 Kiuchi et al. ................ 104/168

| | | | | |
|---|---|---|---|---|
| 6,308,404 B1* | 10/2001 | Hirschmann et al. | .......... | 29/822 |
| 6,494,142 B2* | 12/2002 | Masugaki et al. | ............ | 104/168 |
| 6,648,125 B1* | 11/2003 | Bershadsky | .............. | 198/460.1 |
| 6,732,849 B2* | 5/2004 | Yamamoto | ............. | 198/370.05 |
| 6,814,218 B2* | 11/2004 | Nishihara | ................ | 198/465.1 |
| 7,127,997 B2* | 10/2006 | Nishihara et al. | ............. | 104/89 |
| 7,134,541 B2* | 11/2006 | Matsubara et al. | ..... | 198/468.01 |

(Continued)

FOREIGN PATENT DOCUMENTS

JP    H03-042370    2/1991

(Continued)

*Primary Examiner*—Douglas A Hess
(74) *Attorney, Agent, or Firm*—St. Onge Steward Johnston & Reens LLC (57) ABSTRACT

A carrier type conveying apparatus capable of solving a problem in a conventional conveying apparatus wherein a conveying carriers (1) stop abnormally, comprising a rear-pushing traveling district (3) having, at its inlet, a rear-pushing drive means (5A) propelling the conveying carriers (1) at a constant speed and, at its outlet, a speed control drive means (5B) for sending out the conveying carriers (1) at the constant speed and a high-speed traveling district (4). The conveying apparatus comprises carrier connection systems (carrier connection means (9), connection engagement means (10), connection release means (11)). When the conveying carriers (1) travel in the high-speed traveling district (4), the connection of the conveying carriers (1) adjacent to each other in the longitudinal direction by the carrier connection systems is disabled. Only when the conveying carriers (1) travel in the rear-pushing traveling district (3), the conveying carriers (1) in the longitudinal direction are connected to each other by the carrier connection system to prevent the conveying carriers (1) in contact with each other at their end parts from being separated a specified distance or longer from each other.

4 Claims, 6 Drawing Sheets

U.S. PATENT DOCUMENTS

| | | | |
|---|---|---|---|
| 7,178,660 B2 * | 2/2007 | Dehne et al. | 198/463.1 |
| 7,240,622 B2 * | 7/2007 | Koide | 104/287 |
| 7,293,505 B2 * | 11/2007 | Matsubara et al. | 104/89 |
| 7,458,455 B2 * | 12/2008 | Nakamura et al. | 198/463.3 |
| 7,484,616 B2 * | 2/2009 | Nakamura | 198/465.4 |

FOREIGN PATENT DOCUMENTS

| | | |
|---|---|---|
| JP | H05-170327 | 7/1993 |
| JP | 2003-40105 | 2/2003 |
| JP | 2004-106792 | 4/2004 |

* cited by examiner

CARRIER TYPE CONVEYING APPARATUS AND CONVEYING CARRIER CONNECTION SYSTEM OF THE CONVEYING APPARATUS

TECHNICAL FIELD

The present invention relates to a carrier type conveying apparatus including a rear-pushing traveling district for conveying carriers, to be used as a work line, and a high-speed traveling district to be used as a return line for returning the conveying carriers that have come out from the rear-pushing traveling district to an inlet of the rear-pushing traveling district, and a conveying carrier connection system of the carrier type conveying apparatus.

BACKGROUND ART

The rear-pushing traveling district of the carrier type conveying apparatus described above is provided with, at its inlet, a rear-pushing drive means for propelling the conveying carriers at a constant speed, and at its outlet, a speed control drive means for sending out the conveying carriers at a constant speed, and is known by, for example, Japanese Published Unexamined Patent Application No. Hei-05-170327. There is also known a constitution of a trolley type conveying traveling body in which, for example, as described in Japanese Published Unexamined Patent Application No. Hei-03-42370, connection means for connecting conveying traveling bodies to each other are provided and an after conveying traveling body is pulled by a fore conveying traveling body to travel.

SUMMARY OF THE INVENTION

In the carrier type conveying apparatus including the rear-pushing traveling district constituted as described above, the conveying carriers traveling in the rear-pushing traveling district form a continuous work floor by bringing their end parts into contact with each other, an operator who transfers onto the conveying carriers can perform operations to attach parts to objects to be conveyed loaded on the conveying carriers, and the operator can freely transfer onto other adjacent conveying carriers and change the conveying objects to be operated. Thus, the rear-pushing traveling district can be utilized as a work line, however, in this status of use, if the rear-pushing drive means provided at the inlet of the rear-pushing traveling district malfunctions and it becomes impossible to send out the following conveying traveling bodies that arrived at the rear-pushing traveling district into the rear-pushing traveling district at a constant speed, all of the conveying carriers in the rear-pushing traveling district except for the leading conveying carrier which is about to be sent out into the high-speed traveling district on the lower route by the speed control drive means provided at the outlet of the rear-pushing traveling district, are not pushed from the rear side and stop.

If this situation occurs, even when the operation for the conveying object that is being operated in the rear-pushing traveling district is finished, this object cannot be sent to the high-speed traveling district on the lower route, and this has a crucial harmful influence on a work schedule. Furthermore, between the leading conveying carrier which is about to be sent into the high-speed traveling district on the lower route and the conveying carrier immediately after the leading one, a gap arises which expands gradually, and other conveying carriers in the rear-pushing traveling district slightly advance due to inertia and cause gaps therebetween, so that operators transferring onto the conveying traveling bodies may be caught in the gaps and fall down, and this may lead to a drop accident from the gaps between the carriers.

Therefore, it is considered that the connection means as described in the Patent Japanese Published Unexamined Patent Application No. Hei-03-42370 is introduced in the conventional carrier-type conveying apparatus described in the Japanese Published Unexamined Patent Application No. Hei-05-170327 so that the fore and after conveying carriers adjacent to each other in the rear-pushing traveling district are connected to each other and, even if the rear-pushing drive means provided at the inlet of the rear-pushing traveling district as described above malfunctions and it becomes impossible to send the following conveying carriers which arrived at the rear-pushing traveling district into the rear-pushing traveling district, the conveying carriers in the rear-pushing traveling district are pulled to travel so as to be sent out from this rear-pushing traveling district by the leading conveying carrier which is about to be sent into the high-speed traveling district on the lower route by the speed control drive means provided at the outlet of the rear-pushing traveling district. However, the conventional connection means as described in the Patent Document 2 automatically engages and connects the fore and after conveying carriers when the fore and after conveying carriers approach each other.

Therefore, in the constitution in which the conventional connection means as described in Japanese Published Unexamined Patent Application No. Hei-03-42370 is simply introduced in the conventional carrier type conveying apparatus described in Japanese Published Unexamined Patent Application No. Hei-05-170327, the connection between the fore and after conveying carriers made by the connection means is released at the outlet of the rear-pushing traveling district and the conveying carriers are successively sent into the high-speed traveling district on the lower route, and even if an appropriate distance can be secured between the fore and after the conveying carriers in this high-speed traveling district, when the drive means which drives the conveying carriers at a high speed in the high-speed traveling district malfunctions and one conveying carrier stops in the high-speed traveling district, the following conveying carriers are connected one after another to this stopping conveying carrier by the connection means. Therefore, when the drive means which had malfunctioned is recovered by means of repairing and starts working, although the conveying carriers should be driven at a high speed while maintaining appropriate intervals between conveying carriers in principle, many conveying carriers waiting on the lower route than the recovered drive means are integrally pulled and driven at a high speed while connected together in a row, and this harmfully influences the sending into the rear-pushing traveling district.

An object of the invention is to provide a conveying carrier connection system in a carrier type conveying apparatus capable of solving the above-described conventional problem, which includes, in a traveling route of conveying carriers (1), a rear-pushing traveling district (3) having, at its inlet, a rear-pushing drive means (5A) for propelling the conveying carriers (1) at a constant speed and, at its outlet, a speed control drive means (5B) for sending out the conveying carriers (1) at a constant speed and a high-speed traveling district (4) in which the conveying carriers (1) that came out from the rear-pushing traveling district (3) are made to travel at a high speed, and a carrier connection system (carrier connection means (9), connection engagement means (10), and connection release means (11)) which connects the fore and after adjacent conveying carriers (1), wherein when the conveying carriers (1) travel in the high-speed traveling district (4), the connection between the fore and after conveying carriers (1) by the carrier connection system is disabled, and only when the conveying carriers (1) travel in the rear-pushing traveling district (3), the fore and after conveying carriers (1) are connected to each other by the carrier connection system to prevent the conveying carriers (1) in contact with each other at their end parts from being separated a specified distance or longer from each other.

A second aspect of the invention provides a carrier type conveying apparatus preferable for carrying out the above-described connection system for conveying carriers in a carrier-type conveying apparatus. This carrier type conveying apparatus includes, as in the second aspect, in a traveling route of conveying traveling bodies (1), a rear-pushing traveling district (3) having, at its inlet, a rear-pushing drive means (5A) for propelling the conveying carriers (1) at a constant speed and, at its outlet, a speed control drive means (5B) for sending out the conveying carriers (1) at a constant speed and a high-speed traveling district (4) in which the conveying carriers (1) that came out from the rear-pushing traveling district (3) are made to travel at a high speed, and a carrier connection system (9, 10, and 11) which connects the fore and after adjacent conveying carriers (1), wherein the carrier connection system includes carrier connection means (9), a connection engagement means (10) provided on the inlet side of the rear-pushing traveling district (3), and a connection release means (11) provided on the outlet side of the rear-pushing traveling district (3), the connection engagement means (10) switches the carrier connection means (9) at the inlet of the rear-pushing traveling district (3) to connect the fore and after conveying carriers (1) in contact with each other at their end parts, and the connection release means (11) switches the carrier connection means (9) at the outlet of the rear-pushing traveling district (3) to release the connection between the fore and after conveying carriers (1) and be unable to connect the fore and after conveying carriers (1) in the high-speed traveling district (4).

To carry out the carrier-type conveying apparatus of the invention constituted as described above, in detail, according to a third aspect, the carrier connection means (9) includes a connected part (33A) provided on either one of the front and rear end parts of each conveying carrier (1) and a movable connector (33B) provided on the other of the front and rear end parts of each conveying carrier (1), and the movable connector (33B) can be freely switched between a connecting position and a connection releasing position and formed into a shape so as to be held at the connecting position by an urging force and so as not to automatically engage with the connected part (33A) when conveying carriers (1) approach each other while the movable connector is at the connecting position, and the connection engagement means (10) switches the movable connector (33B) at the connecting position to the connection releasing position and then returns the movable connector (33B) to the connecting position in a state that the end parts of the fore and after conveying carriers (1) are in contact with each other to engage the movable connector to the connected part (33A) as a connecting mate, and the connection release means (11) switches the movable connector (33B) at the connecting position to the connection releasing position, and returns it to the connecting position after the fore conveying carrier (1) travels at a high speed and separates from the after conveying carrier (1).

According to a fourth aspect, the carrier type conveying apparatus can be constituted so that the carrier connection means (9) includes a connected part (33A) provided on either one of the front and rear end parts of each conveying carrier (1) and a movable connector (33B) provided on the other of the front and rear end parts of each conveying carrier, the movable connector (33B) can be freely switched between a connecting position and a connection releasing position and selectively held at a connecting position and at a connection releasing position by an urging force, the connection engagement means (10) switches the movable connector (33B) at the connection releasing position to the connecting position and engages it with the connected part (33A) as a connecting mate in a state that end parts of fore and after conveying carriers (1) are in contact with each other, and the connection release means (11) switches the movable connector (33B) at the connecting position to the connection releasing position.

When the constitution according to the third aspect is employed, as described in a fifth aspect, it is possible that the movable connector (33B) is provided with a cam follower part (39), and the connection engagement means (10) and the connection release means (11) have cam rails (43) which act on the cam follower part (39) and switch the position of the movable connector (33B) according to the traveling of the conveying carriers (1). This constitution is also applicable when the constitution according to the fourth aspect is carried out.

Furthermore, in the case of a carrier type conveying apparatus in which on the conveying carrier (1), a carriage (13) supported while enabled to freely elevate by cross link mechanisms (12) is provided, and in the rear-pushing traveling district (3), carriage pushing-up rails (32) which push up the carriage (13) via the cross link mechanisms (12) are arranged, as described in a sixth aspect, the connected part (33A) is constituted of an upward hook member (34), and the movable connector (33B) is pivotally supported so as to freely move up and down between the connecting position at the lower limit and the connection releasing position at the upper limit, and is provided with, on its free end side, an engagement part (38) engaging downward with the connected part (33A) and a cam follower roller (39), and the connection engagement means (10) and the connection release means (11) include cam rails (43, 48 and 49) which act on the cam follower roller (39) and switch the position of the movable connector (33B) according to the traveling of the conveying carriers (1), and in the rear-pushing traveling district (3), a carrier floating preventive rail (44) which acts on the cam follower roller (39) of the movable connector (33B) to press the movable connector (33B) to the connecting position at the lower limit can be disposed. This constitution can also be carried out by being combined with the constitution of the third or fourth aspect.

According to a conveying carrier connection system in the carrier type conveying apparatus according to the first aspect of the invention, in the rear-pushing traveling district, as in the case of a conventional one of this sort of carrier type conveying apparatus, rear-pushing drive is possible in a state that end parts of fore and after conveying carriers are in contact with each other, so that in this rear-pushing traveling district, a continuous work floor is formed by the conveying carriers, and operations for the objects to be conveyed loaded on the conveying carriers can be performed on the continuous work floor formed by the conveying carriers, and even if the rear-pushing drive means provided at the inlet of the rear-pushing traveling district malfunctions and it becomes impossible to push the conveying carriers from the rear side in the rear-pushing traveling district, the carrier connection system connects the conveying carriers in this rear-pushing traveling district to each other so as to prevent fore and after conveying carriers from separating a specified distance or longer from each other, so that by the leading conveying carrier which is sent into the high-speed traveling district on the lower route by the speed control drive means on the outlet side of this rear-pushing traveling district, all conveying carriers in the rear-pushing traveling district can be reliably sent to the high-speed traveling district on the lower route. Therefore, at least operations for objects to be conveyed on the conveying carriers in the rear-pushing traveling district and sending out of objects to be conveyed the operations for which have been finished can be reliably continued without stop, and its influence on the work schedule can be minimized.

In addition, in the high-speed traveling district in which the conveying carriers sent out from the rear-pushing traveling district are made to travel at a high speed, even when the fore and after conveying carriers approach each other, the fore and after conveying carriers are not connected by the carrier connection system, so that even if an emergency situation occurs in which the means for driving the conveying carriers at a high speed in the high-speed traveling district malfunctions and one conveying carrier stops in the middle of the high-speed traveling district, there is no possibility that following conveying carriers approach and are connected one after another to the stopping conveying carrier by the carrier connection system, and therefore, when restarting after recovery of the malfunction, the conveying carriers can be made to travel at a high speed one by one without fail as in the case of the conventional carrier type conveying apparatus having no carrier connection system, and there is no harmful influence on, for example, sending of the conveying carriers one by one into the rear-pushing traveling district on the lower route.

The conveying carrier connection system in the carrier type conveying apparatus according to the invention described above can be easily carried out by the carrier type conveying apparatus according to the second aspect of the invention, however, when carrying out the carrier type conveying apparatus of the invention, according to the constitution of the third aspect, the movable connector constituting the carrier connection means is held at the connecting position by an urging force, so that it becomes simpler in structure and is more easily carried out than in the case where it is selectively held at the connecting position and the connection releasing position. To the contrary, according to the constitution of the fourth aspect, when the conveying carriers travel in the high-speed traveling district, the movable connector is held at the connection releasing position, so that as in the case where the movable connector is held at the connecting position, when an emergency situation occurs in which the conveying carriers approach each other, the fore and after conveying carriers do not collide with each other via the movable connector at the connecting position and the connected part, and can be made to collide at end parts of the conveying carriers, so that damage to the carrier connection means can be avoided.

According to the constitution of the fifth aspect, the connection engagement means and the connection release means necessary at the inlet and outlet of the rear-pushing traveling district can be simply constituted by cam rails.

In the case of a carrier type conveying apparatus in which the conveying carrier is provided with a carriage supported while enabled to freely elevate by the cross link mechanisms, and in the rear-pushing traveling district, carriage pushing-up cam rails which push up the carriage via the cross link mechanisms are provided, when the carriage is overloaded, although the carriage should be pushed up by the carriage pushing-up cam rails via the cross link mechanisms, there is a possibility that an emergency situation involving floating of the whole of the conveying carrier occurs. To avoid this problem, a carriage floating preventive rail is provided to cover the wheels of the conveying carriers and exclusively provided rollers, however, in the former method, the wheels must be projected lower than the bottom surface of the carrier, and a low-floor conveying carrier realizing excellent workability cannot be obtained, and in the latter method, rollers exclusive for preventing carrier floating are needed, and an increase in cost is inevitable. However, according to the constitution of the sixth aspect, only by adding a carrier floating preventive rail, the carrier floating when the carrier is pushed up in an overloaded state can be prevented by using the cam follower roller of the movable connector for the connection system.

DESCRIPTION OF THE SYMBOLS

1: conveying carrier
2: guide rail
3: rear-pushing traveling district
4: high-speed traveling district
5A: rear-pushing drive means
5B: speed control drive means
5C: high-speed drive means
5D: variable speed drive means
6: friction drive wheel
7: backup roller
9: carrier connection means
10: connection engagement means
11: connection release means 12: cross link mechanism
13: carriage
15a to 16b: wheel unit
18a, 18b: cross link
19: pushing-up operated means
33A: connected part
33B: movable connector
34: hook member
37: up/down arm
38: engagement part
39: cam follower roller
41: tension coil spring
43, 48, 49: cam rail
44: carrier floating preventive rail
45: urging means
46: cam plate
47: leaf spring

DESCRIPTION OF THE PREFERRED EMBODIMENTS

Figure 1:
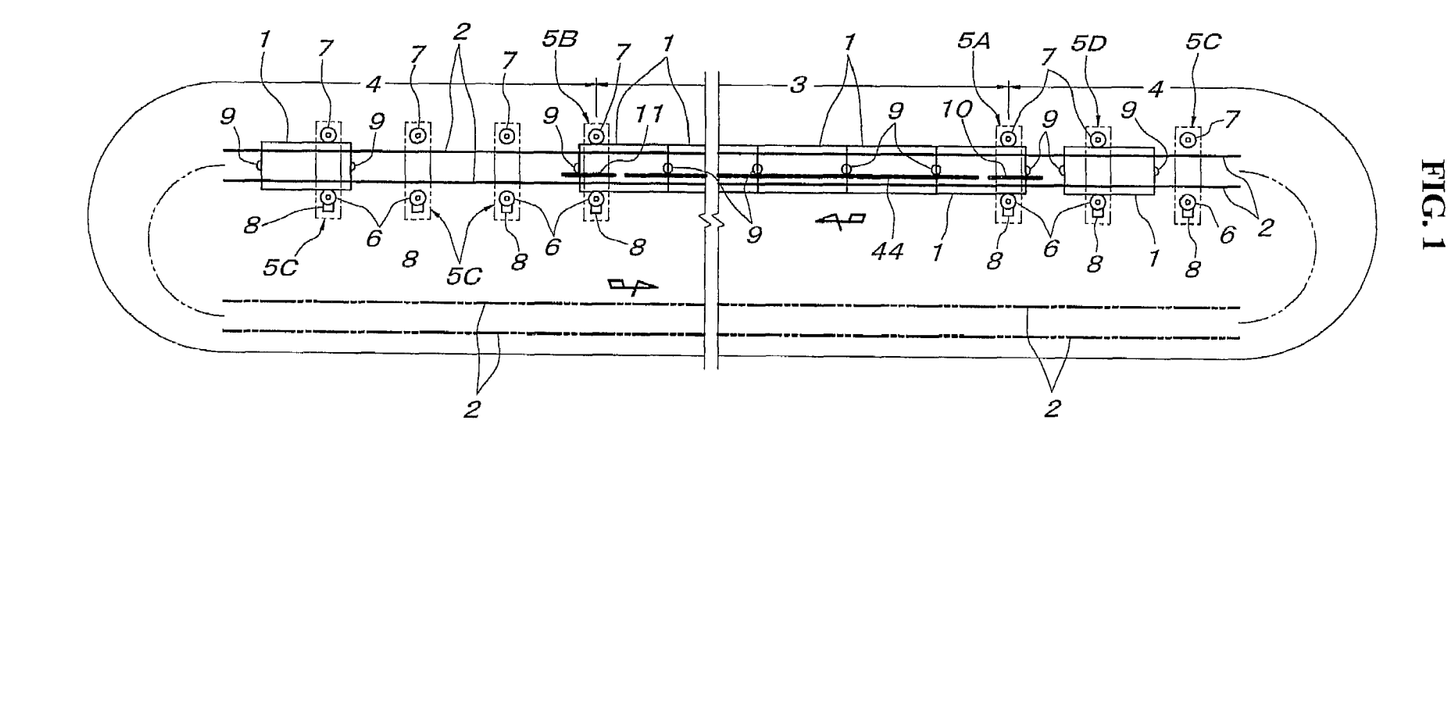
FIG. 1 is a schematic plan view showing an entirety of a carrier type conveying apparatus.

Hereinafter, a detailed embodiment of the invention will be described based on the accompanying drawings. In FIG. 1, the reference numerals 1 denote conveying carriers which travel on a cyclic traveling route including a pair of left and right guide rails 2. This cyclic traveling route is formed by connecting a rear-pushing traveling district 3 and a high-speed traveling district 4 which are straight and parallel to each other by U-turn paths, and in the drawings, only inlet and outlet regions of the rear-pushing traveling district 3 are shown and the remaining route is omitted. In the rear-pushing traveling district 3, a rear-pushing drive means 5A which propels the conveying carriers 1 at a constant speed is provided at an inlet of the rear-pushing traveling district, and a speed control drive means 5B for sending out the conveying carriers 1 at a constant speed is provided at an outlet. In the high-speed traveling district 4, high-speed drive means 5C which propel the conveying carriers 1 sent out from the rear-pushing traveling district 3 at a high speed are arranged at intervals equal to or slightly shorter than the entire lengths of the conveying carriers 1, and at the terminal end thereof on the rear-pushing traveling district 3 side, a variable speed drive means 5D which reduces the speed of the conveying carriers 1 to a traveling speed for the rear-pushing traveling district 3 (conveying carrier drive speed of the rear-pushing drive means 5A) and sends the conveying carriers into the rear-pushing traveling district 3 is provided.

Due to provision of the drive means 5A through 5D, in the rear-pushing traveling district 3, the conveying carriers 1 are in series so that their end parts are in contact with (butted against) each other, and by the tail end conveying carrier 1 driven by the rear-pushing drive means 5A at the inlet of the rear-pushing traveling district 3, all conveying carriers 1 in the rear-pushing traveling district 3 are pushed from the rear side and driven at a constant speed. At this time, the speed control drive means 5B at the outlet of the rear-pushing traveling district 3 is driven with a torque lower than that of the rear-pushing drive means 5A and at a speed slightly lower than the drive speed of the rear-pushing drive means 5A, and by braking the leading conveying carrier 1 in the rear-pushing traveling district 3, the braking speed control drive means 5B prevents the conveying carriers 1 being pushed from the rear side from traveling at a speed higher than the constant speed due to inertia and gaps arise between the conveying carriers 1, and sends out the conveying carriers 1 at a constant speed from the rear-pushing traveling district 3.

The conveying carriers 1 sent out from the rear-pushing traveling district 3 into the high-speed traveling district 4 travel by being switched to high-speed driving by the high-speed drive means 5C, so that in this high-speed traveling district 4, the conveying carriers 1 travel while maintaining predetermined intervals between fore and after conveying carriers 1. Then, the conveying carriers 1 reaching the high speed traveling district 1 are reduced in speed to the conveying carrier drive speed of the rear-pushing drive means 5A by the variable speed drive means 5D and sent into the rear-pushing traveling district 3.

For each of the drive means 5A through 5D, a friction drive means formed by a combination of a friction drive wheel 6 and a backup roller 7 sandwiching the left and right sides of the conveying carrier 1 having a rectangular planar shape long in the traveling direction is used. The reference numeral 8 denotes a motor for driving the friction drive wheel 6.

In the carrier type conveying apparatus described above, according to the invention, a carrier connection system including carrier connection means 9, a connection engagement means 10 provided on the inlet side of the rear-pushing traveling district 3, and a connection release means 11 provided on the outlet side of the rear-pushing traveling district 3 is incorporated. Hereinafter, a detailed structure will be described.

Figure 2A:
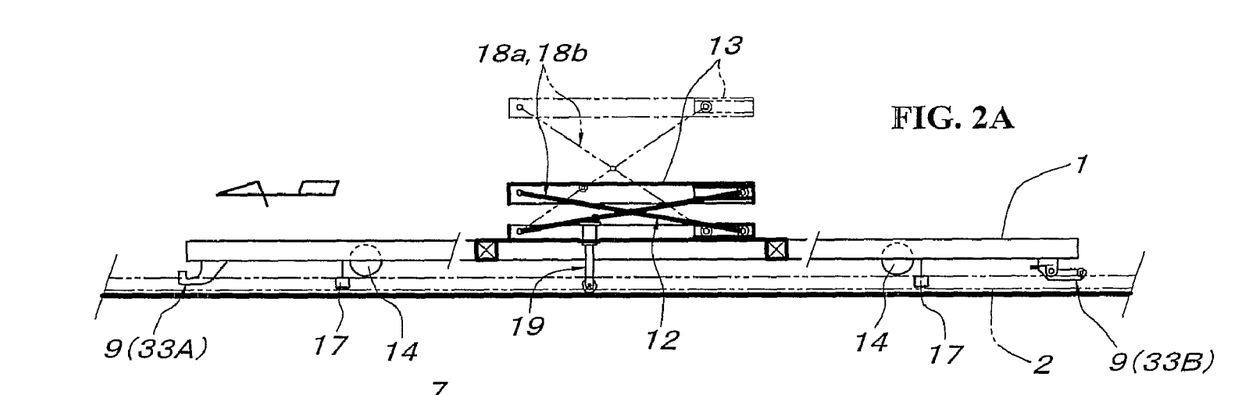
FIG. 2A is a partially longitudinal sectional view showing an example of conveying carriers.
Figure 2B:
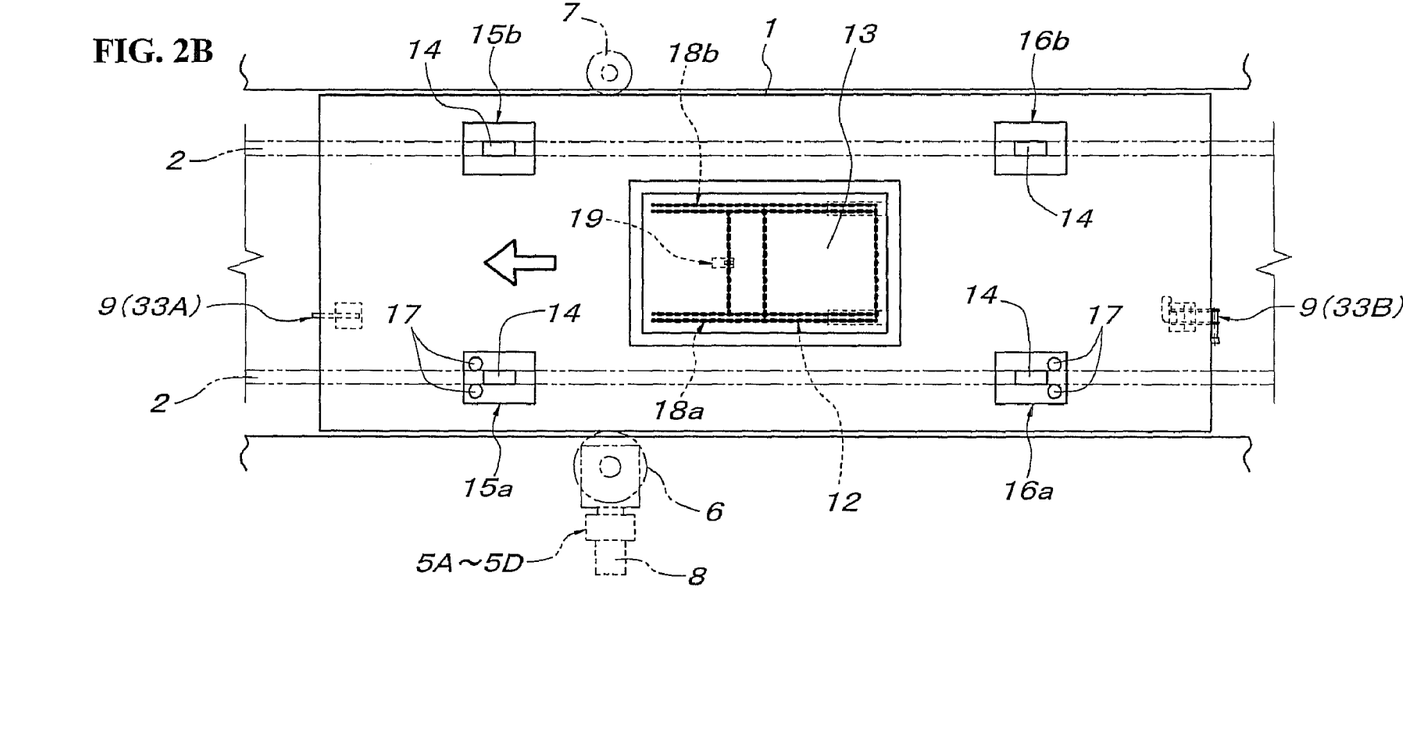
FIG. 2B is a plan view of the same conveying carrier.
Figure 3:
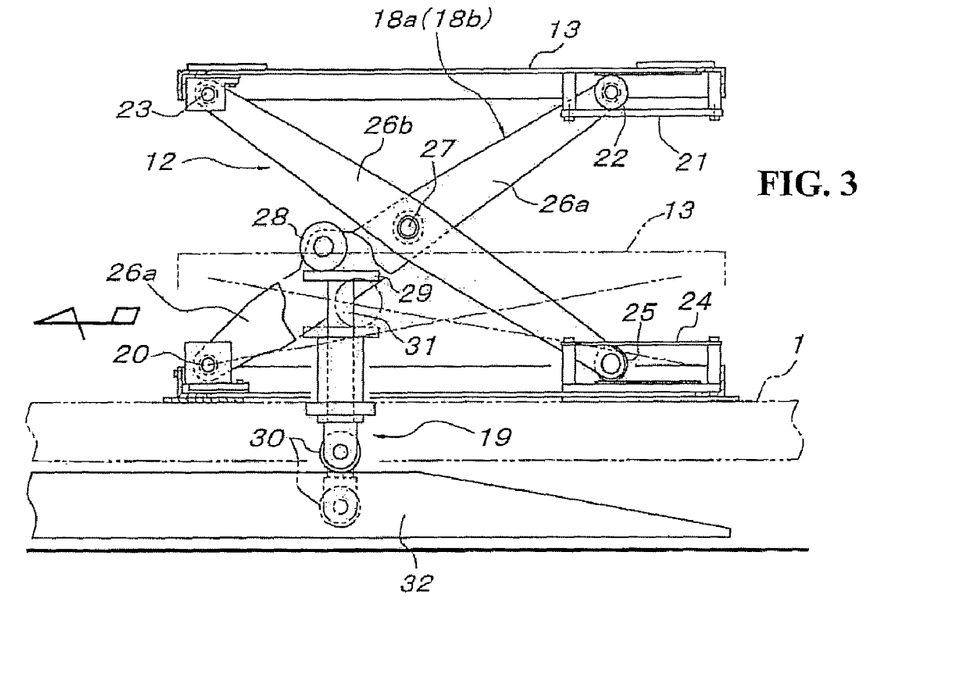
FIG. 3 is a partially cut-away side view showing an elevating mechanism of a carriage provided on the conveying carrier.

As shown in FIG. 2, on the conveying carrier 1, a carriage 13 supported so as to be freely elevated by cross link mechanisms 12 is provided, and on the left and right sides of the front and rear sides of this carriage 13, wheel units 15a through 16b including wheels 14 which roll on the guide rails 2 are provided. The wheel units 15a and 16a corresponding to one side of guide rail 2 have a pair of left and right positioning vertical axis rollers 17 which sandwich the guide rail 2 from the left and right sides. The cross link mechanism 12 has, as shown in FIG. 2 and FIG. 3, a pair of left and right cross links 18a and 18b and a pushing-up operated means 19. In each of the cross links 18a and 18b, a link 26a having one end pivotally supported on the conveying carrier 1 side by a support shaft 20 so as to freely rise and the other end provided with a horizontal axis roller 22 that engages with a horizontal slide guide 21 provided on the bottom of the carriage 13, and a link 26b having one end pivotally supported on the bottom side of the carriage 13 by a support shaft 23 so as to freely rise and the other end provided with a horizontal axis roller 25 that engages with a horizontal slide guide 24 provided on the conveying carrier 1, are cross-linked by a support shaft 27, and arbitrary support shafts among the support shafts 20, 23, and 27 and the support shafts of the horizontal axis rollers 22 and 25 may be shared by the cross links 18a and 18b.

The pushing-up operated means 19 includes, between the links 26a of the cross links 18a and 18b, a horizontal axis roller 28 pivotally supported between the support shafts 20 and 27, and an elevating member 31 which is supported on the conveying carrier 1 side so as to freely elevate, and has a pushing-up base 29 for pushing-up the horizontal axis roller 28 on its upper end and a cam follower roller 30 pivotally supported on its lower end. In the rear-pushing traveling district 3 to be used as a work line, as shown in FIG. 3, carriage pushing-up rails 32 which push up the cam follower roller 30 according to the traveling of the conveying carrier 1 and push up the carriage 13 via the elevating member 31, the pushing-up base 29, the horizontal axis roller 28, and both cross links 18a and 18b are laid.

The carrier connection means 9 include, as shown in FIG. 2, a connected part 33A provided on the front end side of the conveying carrier 1 and a movable connector 33B provided on the rear end side of the conveying carrier 1. As shown in FIG.

Figure 4A:
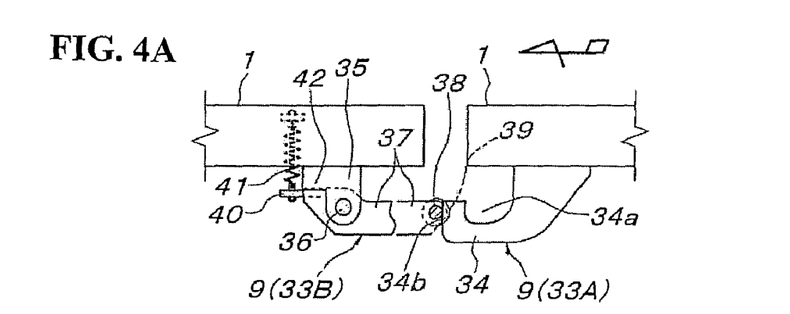
FIG. 4A is a partially cut-away side view showing carrier connection means when conveying carriers approach each other in a high-speed traveling district.
Figure 4B:
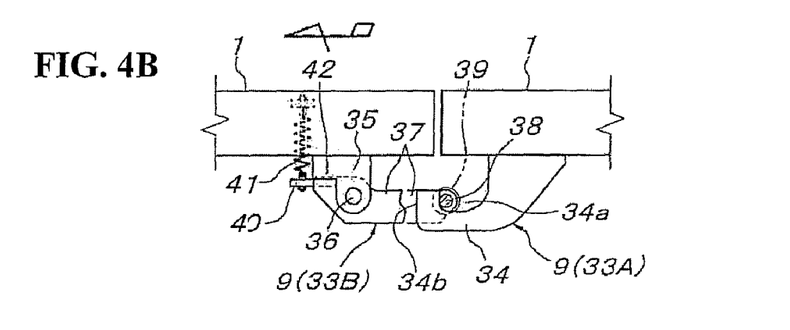
FIG. 4B is a partially cut-away side view showing carrier connection means when pulling the following conveying carriers in the rear-pushing traveling district.
Figure 5:
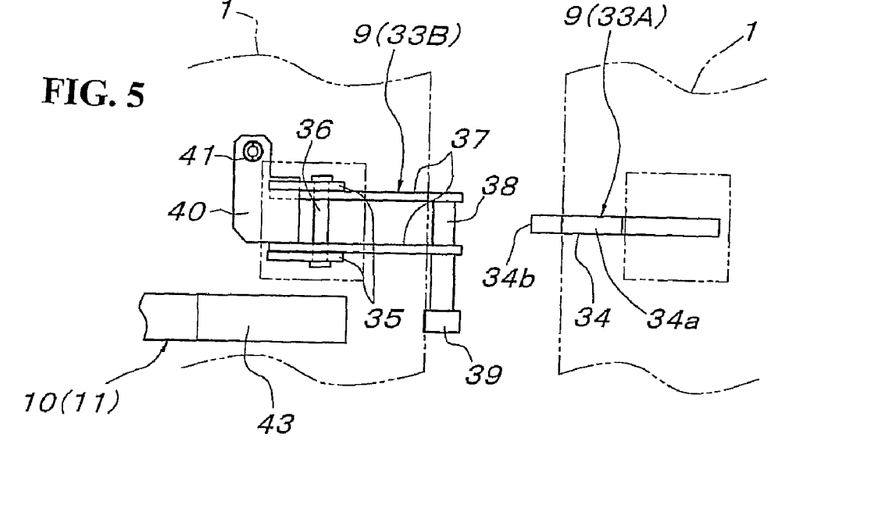
FIG. 5 is a plan view showing carrier connection means and a part of a cam rail which switches a movable connector of the carrier connection means to a connection releasing position.

4 and FIG. 5, the connected part 33A includes a hook member 34 that is formed of a vertical plate member attached to the front end lower side of the conveying carrier 1 so as to extend forward and has a tip end in an upward hook shape. A front end face 34b of a tip end raised portion forming an upward open concave portion 34a of the hook member 34 is formed to be vertical.

The movable connector 33B of the carrier connection means 9 includes a pair of left and right arms 37 freely movable up and down which are pivotally supported on a bearing member 35 projectedly provided on the lower side near the rear end of the conveying carrier 1 by a horizontal support shaft 36 set transverse, and extend rearward, and an engagement part 38 formed of a horizontal shaft laid across the tip end parts (rear end parts) of the arms 37, and the horizontal shaft forming this engagement part 38 is extended to one side and on its free end, a cam follower roller 39 is supported, and by a tension coil spring 41 tensioned and provided between a spring latching member 40 fixed to a portion extending from the support shaft 36 of the arms 37 to the opposite side (forward) and the conveying carrier 1, the movable connector 33B is held in an urged state to a connecting position at the lower limit where the spring latching member 40 comes into contact with a stopper 42 provided on the bearing member 35. Instead of the tension coil spring 41, a twist coil spring which freely fits with the support shaft 36 may be used, or it is also possible that the movable connector 33B is held in an urged state to the connecting position at the lower limit by gravity by providing a sufficient weight on the engagement part 38 side.

The movable connector 33B constructed as described above is provided so that the engagement part 38 is positioned on an imaginary straight line in the fore and after direction passing through the connected part 33A (hook member 34), and in the movable connector 33B held in an urged state to the connecting position at the lower limit by the spring 41, as shown in FIG. 4A, the engagement part 38 is positioned at the same level as or slightly lower than the central axis level of the support shaft 36 and when the engagement part 38 is pushed horizontally rearward by the front end vertical face 34b of the hook member 34 as the connected part 33A of the after conveying carrier 1, this movable connector 33B does not move upward against the urging force of the spring 41. In this movable connector 33B, as shown in FIG. 4B, when the fore and after conveying carriers 1 are adjacent to each other in a state that their end parts are in contact with each other, the engagement part 38 can be engaged downward in a concave portion 34a of the hook member 34 as the connected part 33A of the after conveying carrier 1.

Figure 6A:
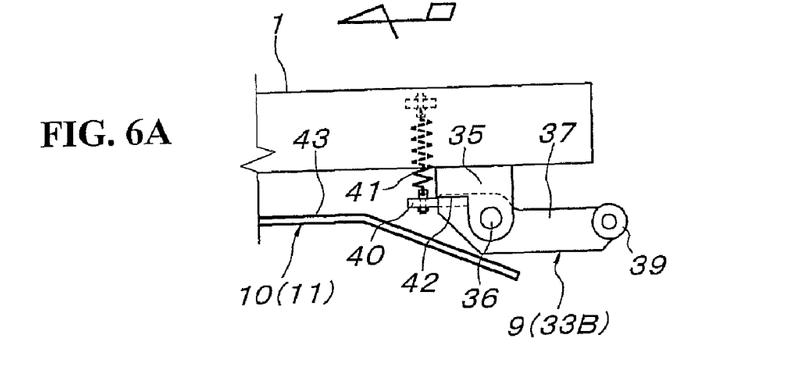
FIG. 6A is a side view showing the movable connector and a part of the cam rail which switches the movable connector to the connection releasing position.
Figure 6B:
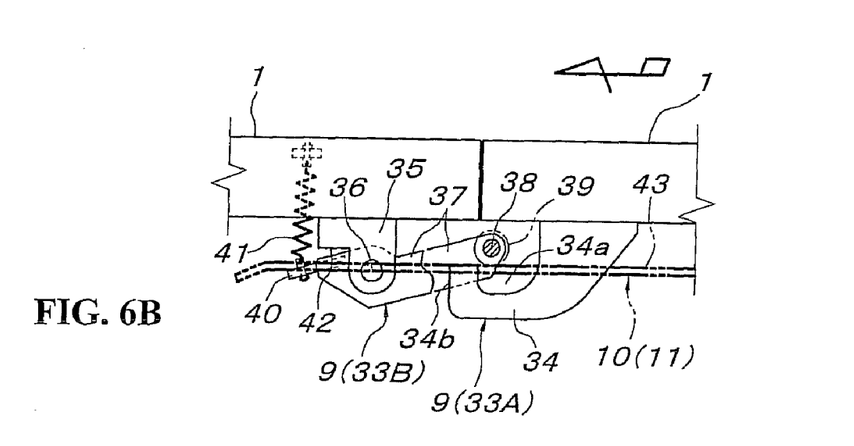
FIG. 6B is a partially cut-away side view showing the movable connector switched to the connection releasing position and a connected part with which the movable connector engages.
Figure 7A:
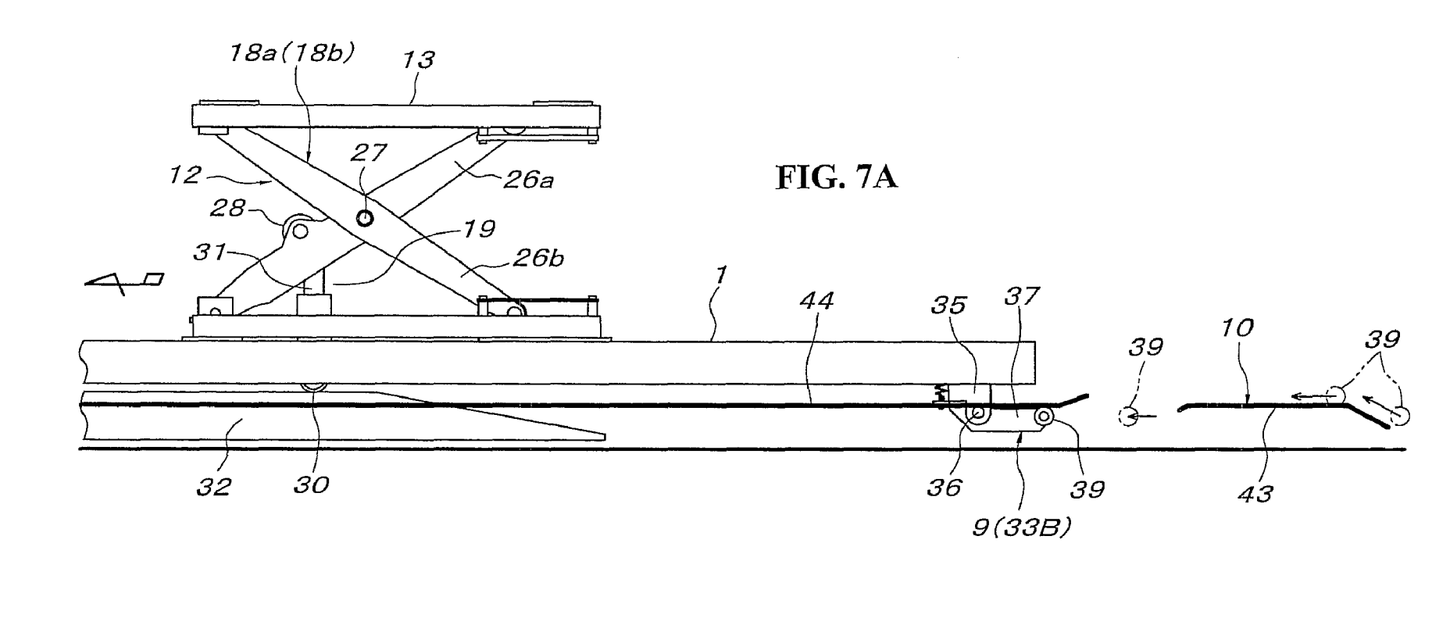
FIG. 7A is a side view of a main portion in a state that an elevating carriage of the conveying carrier is pushed up and a cam follower roller of the movable connector acts on a carrier floating preventive rail.
Figure 7B:
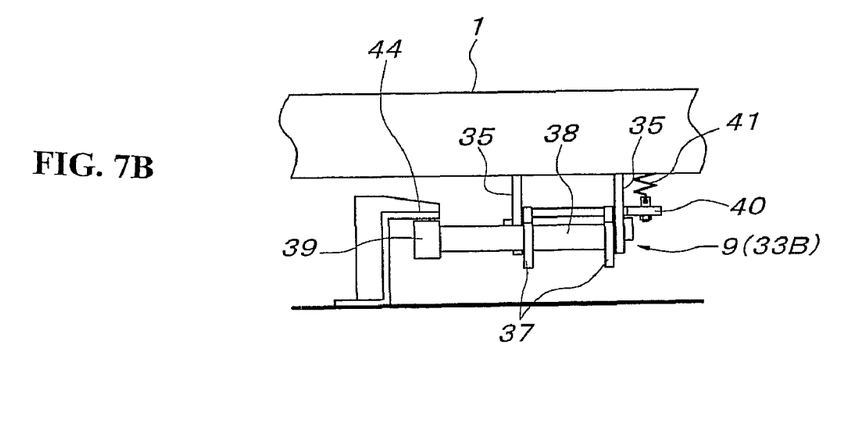
FIG. 7B is a back view of the main portion showing the cam follower roller of the movable connector and the carrier floating preventive rail.

The connection engagement means 10 and the connection release means 11 shown in FIG. 1 are formed by, as shown in FIG. 5 and FIG. 6, cam rails 43 which act on the cam follower roller 39 of the movable connector 33B, and move up the movable connector 33B against the urging force of the spring 41 according to the traveling of the conveying carriers 1, and switch the movable connector 33B to a connection releasing position at which the engagement part 38 is slightly higher than the upper end level of the front end raised portion of the hook member 34 as the connected part 33A. As shown by the imaginary line of FIG. 1 and in FIG. 7, in the rear-pushing traveling district 3, a carrier floating preventive rail 44 can be provided which covers the cam follower roller 39 of the movable connector 33B to prevent the movable connector 33B from moving up against the urging force of the spring 41 while leaving an appropriate space from the cam rails 43 forming the connection engagement means 10 and the connection release means 11 provided at the inlet and the outlet of the district.

In the constitution described above, the lengths and positions of the cam rails 43 forming the connection engagement means 10 and the connection release means 11 are set so that the following action is reliably performed. That is, as described above, at the inlet of the rear-pushing traveling district 3, conveying carriers 1 are successively sent into the rear-pushing traveling district 3 from the high-speed traveling district 4 on the higher route, and in this process, the vicinity of the inlet of the rear-pushing traveling district 3 includes a region in which the after conveying carrier 1 comes up to the fore conveying carrier and their end parts are adjacent to each other. The cam rail 43 of the connection engagement means 10 is provided to cover this region.

Therefore, at the inlet of the rear-pushing traveling district 3, as shown in FIG. 6B, in a state that the movable connector 33B of the fore conveying carrier 1 is switched to the connection releasing position via the cam rail 43 and the cam follower roller 39, the after conveying carrier 1 approaches this fore conveying carrier 1, so that as shown in FIG. 4A, the movable connector 33B at the connecting position of the fore conveying carrier 1 and the hook member 34 as the connected part of the after conveying carrier 1 are not brought into contact with each other, and the front end of the after conveying carrier 1 comes into contact with the rear end of the fore conveying carrier 1. In this state, the fore and after conveying carriers 1 advance more and then the cam follower roller 39 of the movable connector 33B is disengaged from the cam rail 43, the movable connector 33B moves downward due to the urging force of the spring 41 to return to the connecting position, and as shown in FIG. 4B, the engagement part 38 of the movable connector 33B of the fore conveying carrier 1 engages downward in the concave portion 34a of the hook member 34 as the connected part of the after conveying carrier 1, whereby these fore and after conveying carriers 1 are connected to each other. The fore and after conveying carriers 1 in this connected state are allowed to come into contact at their end parts with each other, but are prevented from being separated a specified distance or longer in the fore and after direction by the contact between the engagement part 38 of the movable connector 33B and the front end raised portion of the hook member 34 as shown in FIG. 4B.

In other words, all conveying carriers 1 within the rear-pushing traveling district 3 in which the conveying carriers 1 are driven by being pushed from the rear side by the tail end conveying carrier 1 that is driven at a constant speed by the rear-pushing drive means 5A travel at a constant speed in a desired state in that their end parts are in contact with each other, and the connected part 33A and the movable connector 33B of the carrier connection means 9 do not apply loads to each other although they engage with each other, so that the fore conveying carrier 1 is not pulling the after conveying carrier 1. However, if the rear-pushing drive means 5A malfunctions and rear-pushing driving for the tail end conveying carrier 1 to be sent from the high-speed traveling district 4 is not performed, all conveying carriers 1 in the rear-pushing traveling district 3 after the leading conveying carrier 1 to be sent out from the rear-pushing traveling district 3 by the speed control drive means 5B at the outlet of the rear-pushing traveling district 3 are successively pulled by the fore conveying carriers 1 due to engagement between the movable connectors 33B of the fore conveying carriers 1 and the connected parts 33A (hook member 34) of the after conveying carriers 1, and sent out into the high-speed traveling district 4 on the lower route by the speed control drive means 5B without staying in the rear-pushing traveling district 3.

Before the leading conveying carrier 1 to be sent out from the rear-pushing traveling district 3 according to the rear-pushing action of the after conveying carrier 1 or the constant speed sending action of the speed control drive means 5B in the above-described emergency situation, the cam rail 43 of the connection release means 11 moves up the movable connector 33B at the connecting position of this leading conveying carrier 1 against the urging force of the spring 41 via the cam follower roller 39, and as shown in FIG. 6B, switches the movable connector 33B to the connection releasing position at which the engagement part 38 comes out upward from the inside of the concave portion 34a of the hook member 34 as the connected part 33A of the after conveying carrier 1. In this state, simultaneously when or after the leading conveying carrier 1 separates from the speed control drive means 5B, the leading conveying carrier 1 is pushed from the rear side by the after conveying carrier 1 and reaches a position where it is propelled by the first high-speed drive means 5C in the high-speed traveling district 4, whereby the leading conveying carrier 1 separates from the after conveying carrier 1 and travels at a high speed. After the leading conveying carrier 1 is thus driven at a high speed and separated from the after conveying carrier 1, the movable connector 33B of this leading conveying carrier 1 separates at its cam follower roller 39 from the cam rail 43 and returns again to the connecting position by the urging force of the spring 41.

Therefore, the movable connector 33B of each conveying carrier 1 traveling at a high speed in the high-speed traveling district 4 is in a state that it is urged to and held at the connecting position at the lower limit by the urging force of the spring 41. Therefore, even if one of the high-speed drive means 5C malfunctions and causes an emergency situation in which the first conveying carrier 1 stops in the middle of the high-speed traveling district 4 and the following conveying carriers 1 approach and collide with the first conveying carrier 1 being stopped, the movable connector 33B of the fore conveying carrier 1 and the connected part 33A of the after conveying carrier 1 only comes into contact with each other between the engagement part 38 of the movable connector 33B and the front end vertical face 34b of the front end raised portion of the hook member 34 as shown in FIG. 4A, and there is no possibility that the engagement part 38 of the movable connector 33B engages in the concave portion 34a of the hook member 34 and the fore and after conveying carriers 1 are connected to each other. Therefore, when the high-speed drive means 5C which had stopped is recovered and restarted, the conveying carriers 1 which had stopped in series are driven at a high speed independently from each other, so that there is no possibility that a plurality of conveying carriers 1 are driven at a high speed while connected to each other by the carrier connection means 9.

The rear-pushing traveling district 3 is used as a work line as described above. That is, on each conveying traveling body 1 that has entered this rear-pushing traveling district 3, operations to attach parts to a objects to be conveyed (for example, an automobile body) loaded on the carriage 13 are performed, and at this time, according to the level of a portion to be operated of the objects to be conveyed, the carriage 13 is automatically elevated to a predetermined level via the carriage pushing-up rails 32 and the cross link mechanisms 12. That is, when the conveying carrier 1 enters a district in which the carriage pushing-up rails 32 are laid within the rear-pushing traveling district 3, the carriage pushing-up rails 32 raise the cross links 18a and 18b of the cross link mechanisms 12 via the pushing-up operated means 19 to elevate the carriage 13 to a predetermined level, and at this time, if the carriage 13 is overloaded (over loading capacity), when the carriage pushing-up rails 32 attempt to raise the cross links 18a and 18b, the cross links 18a and 18b do not rise and the conveying carriage 1 itself is pushed up and may float from the guide rails 2. However, in this embodiment, the conveying carrier 1 which has entered the rear-pushing traveling district 3 and whose movable connector 33B has been separated from the cam rail 43 of the connection engagement means 10 travels to the outlet of the rear-pushing traveling district 3 in a state that the carrier floating preventive rail 44 covers the cam follower roller 39 of this movable connector 33B to prevent an upward movement of the movable connector 33B that has returned to the connecting position at the lower limit, so that when the conveying carrier 1 itself is about to float due to a reaction force of the pushing-up operation for the carriage 13, the cam follower roller 39 of the movable connector 33B at the lower limit position comes into contact with the lower side surface of the carrier floating preventive rail 44 and prevents floating of the conveying carrier 1.

Figure 8:
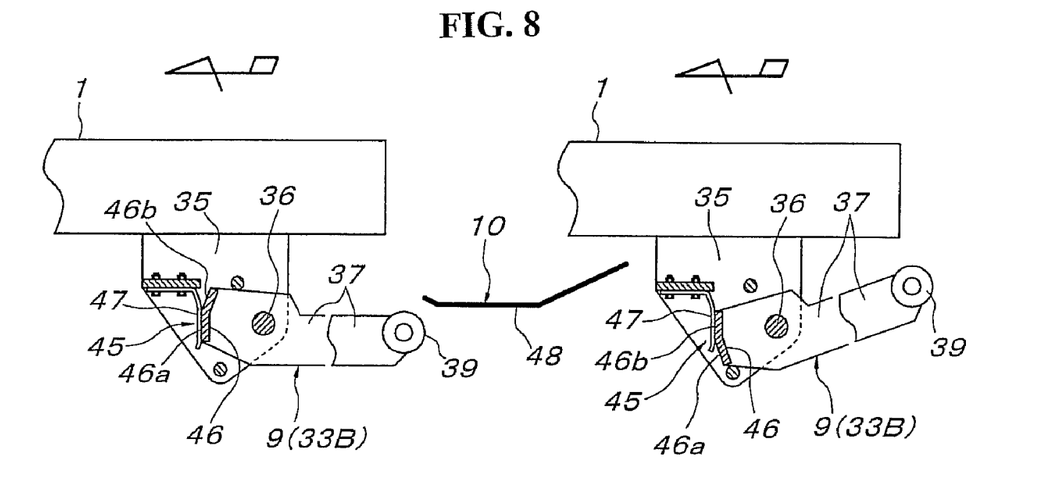
FIG. 8 is a partially longitudinal sectional view showing a cam rail of a connection engagement means in another embodiment and movable connectors on fore and after positions of the cam rail.

In the embodiment described above, the movable connector 33B is held in an urged state to the connecting position at the lower limit by the spring 41, however, as shown in FIG. 8, it is also possible that the movable connector 33B is pivotally supported by a support shaft 36 so as to freely swing up and down between the connecting position at the lower limit and the connection releasing position at the upper limit, and an urging means 45 which switches and holds this movable connector 33B selectively between the connecting position at the lower limit and the connection releasing position at the upper limit is provided. This urging means 45 includes, for example, as illustrated, a cam plate 46 provided on a side opposite the side of the engagement part 38 with respect to the support shaft 36 of the movable connector 33B and a leaf spring 47 which pressure-contacts with the cam plate 46. The cam plate 46 is provided with a cam surface 46a with which the leaf spring 47 pressure-contacts and holds the movable connector 33B at the connecting position when this movable connector 33B is at the connecting position at the lower limit, and a cam surface 46b with which the leaf spring 47 pressure-contacts to hold the movable connector 33B at the connection releasing position when this movable connector 33B is at the connection releasing position at the upper limit. Thus, the central position between the connecting position at the lower limit and the connection releasing position at the upper limit becomes a dead point of the movable connector 33B, and by moving up or down the movable connector 33B against the urging force of the leaf spring 47 to a position over this dead point, it automatically moves to the opposite position due to the urging force of the leaf spring 47 and is held there.

Figure 9:
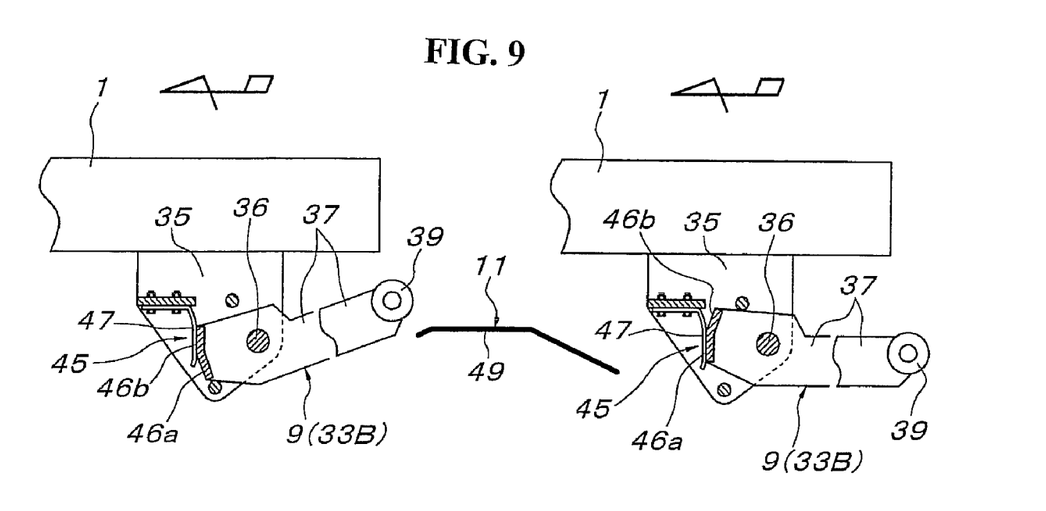
FIG. 9 is a partially longitudinal sectional view showing a cam rail of a connection engagement means in another embodiment of FIG. 8 and movable connectors on fore and after positions of the cam rail.

When using the carrier connection means 9 including the movable connector 33B constituted as described above, as the connection engagement means 10 provided at the inlet of the rear-pushing traveling district 3, as shown in FIG. 8, the cam rail 48 which forcibly moves the movable connector 33B held at the connection releasing position to a position over the dead point toward the connecting position side via the cam follower roller 39 is provided, and as the connection release means 11 provided at the outlet of the rear-pushing traveling district 3, as shown in FIG. 9, the cam rail 49 which forcibly moves the movable connector 33B held at the connecting position to a position over the dead point toward the connection releasing position via the cam follower roller 39 is provided.

Therefore, the movable connectors 33B of the respective conveying carriers traveling at a high speed in the high-speed traveling district 4 are urged to and held at the connection releasing position differently from the aforementioned embodiment, so that even if a certain conveying carrier 1 makes an emergency stop, conveying carriers 1 after this carrier stop in a state that their front ends are in contact with the rear ends of the fore conveying carriers 1 independently from the carrier connection means 9, there is no possibility that the conveying carriers apply loads to the carrier connection means 9.

INDUSTRIAL APPLICABILITY

The conveying carrier connection system in the carrier type conveying apparatus of the invention is constructed so that an automobile body (object to be conveyed) to which various parts will be attached is loaded on the carriage and conveyed so that an operator who gets on the conveying carrier 1 in a part assembly operation district (rear-pushing traveling district described in the embodiment) 3 performs operations to attach parts to the automobile body, and this is applicable to an automobile assembly line.

The invention claimed is:

1. A carrier type conveying apparatus comprising, in a traveling route of conveying carriers, a rear-pushing traveling district having, at an inlet thereof, a rear-pushing drive means for propelling the conveying carriers at a constant speed, and at an outlet thereof, a speed control drive means for sending out the conveying carriers at a first constant speed and a high-speed traveling district in which the conveying carriers exiting the rear-pushing traveling district travel at a second speed higher than the first speed, and a carrier connection system which connects fore and after adjacent conveying carriers to each other, wherein the carrier connection system comprises carrier connection means, a connection engagement means provided at the inlet of the rear-pushing traveling district, and a connection release means provided at the outlet of the rear-pushing traveling district, the connection engagement means switches the carrier connection means at the inlet of the rear-pushing traveling district to connect fore and after conveying carriers whose end parts are in contact with each other, and the connection release means switches the carrier connection means at the outlet of the rear-pushing traveling district to release the connection between the fore and after conveying carriers and disable the connection between fore and after conveying carriers in the high-speed traveling district, and wherein the carrier connection means comprises a connected part provided on either one of the front and rear end parts of each conveying carrier and a movable connector provided on the other of the front and rear end parts of each conveying carrier, and the movable connector can be switched between a connecting position and a connection releasing position and is shaped so as to be held in the connecting position by an urging force and so as not to automatically engage with the connected part when conveying carriers approach each other while the movable connector is at the connecting position, and the connection engagement means switches the movable connector from the connecting position to the connection releasing position and then returns the movable connector to the connecting position in a state that the end parts of the fore and after conveying carriers are in contact with each other to engage the movable connector to the connected part as a connecting mate, and the connection release means switches the movable connector from the connecting position to the connection releasing position, and returns the movable connector to the connecting position after the fore conveying carrier travels at the second speed and separates from the after conveying carrier.

2. A carrier type conveying apparatus comprising, in a traveling route of conveying carriers, a rear-pushing traveling district having, at an inlet thereof, a rear-pushing drive means for propelling the conveying carriers at a constant speed, and at an outlet thereof, a speed control drive means for sending out the conveying carriers at a first constant speed and a high-speed traveling district in which the conveying carriers exiting the rear-pushing traveling district travel at a second speed higher than the first speed, and a carrier connection system which connects fore and after adjacent conveying carriers to each other, wherein the carrier connection system comprises carrier connection means, a connection engagement means provided at the inlet of the rear-pushing traveling district, and a connection release means provided at the outlet of the rear-pushing traveling district, the connection engagement means switches the carrier connection means at the inlet of the rear-pushing traveling district to connect fore and after conveying carriers whose end parts are in contact with each other, and the connection release means switches the carrier connection means at the outlet of the rear-pushing traveling district to release the connection between the fore and after conveying carriers and disable the connection between fore and after conveying carriers in the high-speed traveling district, and wherein the carrier connection means comprises a connected part provided on either one of the front and rear end parts of each conveying carrier and a movable connector provided on the other of the front and rear end parts of each conveying carrier, the movable connector can be switched between a connecting position and a connection releasing position and selectively held at the connecting position and at the connection releasing position by an urging force, the connection engagement means switches the movable connector from the connection releasing position to the connecting position and engages the movable connector with the connected part as a connecting mate in a state that end parts of fore and after conveying carriers are in contact with each other, and the connection release means switches the movable connector from the connecting position to the connection releasing position.

3. The carrier type conveying apparatus according to claim 1, wherein the movable connector is provided with a cam follower part, and the connection engagement means and the connection release means comprise cam rails which act on the cam follower part (39) and switch the position of the movable connector according to the traveling of the conveying carriers.

4. The carrier type conveying apparatus according to claim 1, wherein the connected part comprises an upward hook member, and the movable connector is pivotally supported so as to freely move up and down between the connecting position at a lower limit and the connection releasing position at an upper limit, and is provided with, on its free end side, an engagement part engaging downward with the connected part and a cam follower roller, and the connection engagement means and the connection release means comprise cam rails which act on the cam follower roller and switch the position of the movable connector according to the traveling of the conveying carriers, and on the conveying carrier, a carriage supported while enabled to freely elevate by cross link mechanisms is provided, and in the rear-pushing traveling district, carriage pushing-up rails which push up the carriage via the cross link mechanisms and a carrier floating preventive rail which acts on the cam follower roller of the movable connector to press the movable connector to the connecting position at the lower limit are arranged.

* * * * *